Patented Sept. 7, 1937

2,092,143

UNITED STATES PATENT OFFICE 2,092,143

AZODYESTUFFS AND THEIR MANUFACTURE

Hugo Schweitzer, Leverkusen-Wiesdorf, Germany, assignor to General Aniline Works, Inc., New York, N. Y., a corporation of Delaware No Drawing. Application May 4, 1934, Serial No. 723,977. In Germany May 18, 1933

4 Claims. (Cl. 260—86)

The present invention relates to a process of preparing monoazodyestuffs and to the products obtainable in accordance with the said process, more particularly it relates to azodyestuffs which may be represented by the probable general formula:

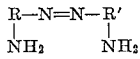

wherein R stands for the radical of a diazotization component, R' stands for the radical of a coupling component of the naphthalene series and wherein both the amino groups stand in o-position to the azobridge.

My new azodyestuffs are obtainable by starting with a nitroazodyestuff of the general formula:

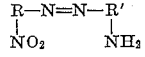

wherein R and R' mean the same as stated above, and wherein the nitro group and the amino group each stand in o-position to the azo-bridge, and treating the same in an aqueous alkaline reacting medium with the calculated quantity of a ferro compound required for reducing the nitro group to the amino group. The temperatures at which the process may be carried out may be varied within the widest limits, for example, it may be performed between about 20° C. and about the boiling temperature of the reaction mixture. A preferred method of preparing the new dyestuffs resides in dissolving or suspending the nitroazodyestuff in an aqueous alkaline reacting medium, for example, an aqueous solution of ammonia, a caustic alkali, an alkali metal carbonate or bicarbonate or a watersoluble organic base, such as pyridine, adding thereto the calculated quantity of a watersoluble ferrosalt, advantageously in form of an aqueous solution, at about 20–40° C., and then raising the temperature say up to between about 90° C. and the boiling point of the reaction mixture. The reduction of the nitro group to the amino group is soon complete, say after ½ hour to 1 hour, from the reaction mixture the iron is removed, for example, by filtration, and the new aminoazodyestuff formed is separated in the usual manner, for example, by salting out or precipitating with the aid of a mineral acid.

The new dyestuffs can be used as dyestuffs per se or as intermediate products for the manufacture of dyestuffs. Those containing solubilizing groups are soluble in aqueous alkalies and yield various colored solutions depending upon the specific starting dyestuffs used; on the addition of a mineral acid to the solution the coloration is generally turned to yellow to orange.

The invention is illustrated by the following examples, without being limited thereto:

*Example 1.*—39.4 grams of the dyestuff 2-nitraniline-4-sodium-sulfonate-azo-2-naphthylamine are suspended in about 2 litres of water. Thereto are added 120 ccs. of aqueous ammonia of 20% strength, and while well stirring, there is introduced at about 40° C. a solution of 168 grams of ferrous sulfate (FeSO$_4$.7H$_2$O) in one litre of water. Then the temperature is raised to 90–100° C. The solution is filtered with suction from the iron sludge, and the dyestuff separated with the aid of mineral acid is purified by treating with glacial acetic acid. The dyestuff having in the free state the following probable formula:

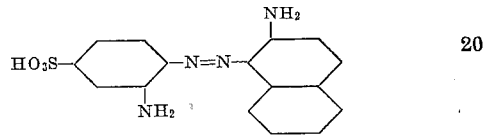

is soluble in an aqueous soda solution with an orange-red coloration.

If instead of the 2-nitraniline-4-sulfonic acid other derivatives of the 2-nitraniline are used and instead of 2-naphthylamine, 2-naphthylaminesulfonic acids capable of being coupled, there are obtained dyestuffs exerting similar properties.

*Example 2.*—41 grams of the azodyestuff 2-nitraniline-azo-2-amino-8-naphthol-6-sodium sulfonate (acid coupling) are reduced and worked up as described in Example 1. The dyestuff having in the free state the following formula:

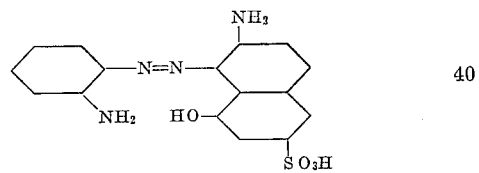

is obtained after drying as a dark powder, soluble in aqueous alkalies with a red coloration.

If instead of 2-nitraniline there are used derivatives thereof or instead of 2-amino-8-naphthol-6-sulfonic acid derivatives thereof coupling in an acid medium, there are obtained dyestuffs of similar properties.

*Example 3.*—51.2 grams of the azodyestuff o-nitraniline-azo-1,8-aminonaphthol-3,6-disodium sulfonate (acid coupling) are reduced with ferrous sulfate and worked up as described in Example 1. The dyestuff having in its free state the following probable formula:

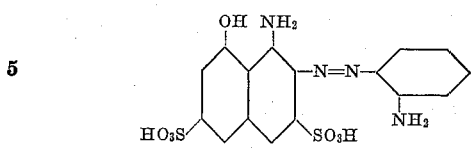

is after drying obtained as a brown powder, soluble in aqueous alkalies with a bluish-red coloration.

If instead of the o-nitraniline there are used derivatives thereof, such as 1-amino-2-nitro-4-chloro- (or -methyl- or -methoxy-) benzene, dyestuffs exerting similar properties are obtained.

*Example 4.*—39.4 grams of the dyestuff 2-nitraniline-1-azo-naphthylamine-4 - sodium-sulfonate are reduced as described in Example 1. The new dyestuff having in the free state the following probable formula:

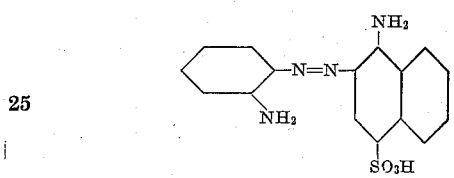

is separated in the usual manner and purified by treating with hot glacial acetic acid. The new dyestuff is, after drying, obtained in form of a red powder, soluble in aqueous soda solution with an orange-red coloration.

If instead of 2-nitraniline there are used derivatives and instead of 2-naphthylamine-4-sulfonic acid derivatives thereof, dyestuffs exerting similar properties are obtained.

*Example 5.*—38.7 grams of the azodyestuff 2-nitraniline-azo-1,8 - naphthylenediamine-4 - sulfonic acid (coupled in the presence of sodium acetate) are reduced as described in Example 1. The dyestuff having in the free state the following probable formula:

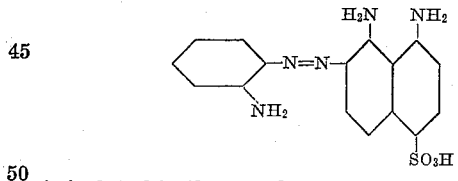

is isolated in the usual manner, purified by treating with hot glacial acetic acid and dried. It is obtained in form of a black powder, soluble in aqueous soda solution with a Bordeaux red coloration.

*Example 6.*—57.2 grams of the disazodyestuff, prepared by coupling in an acid medium diazotized 2-nitraniline with 1-amino-8-naphthol-3,6-disulfonic acid, and in an alkaline medium with diazotized aniline, are reduced as described in Example 1. The new dyestuff having in the free state the following probable formula:

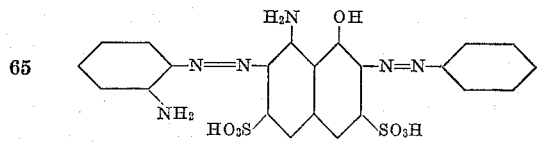

is, after drying, obtained as a black powder, soluble in aqueous alkalies with a bluish-red coloration.

By substituting the 2-nitroaniline by substitution products thereof, such as 2-nitroaniline-4-sulfonic acid or 1-amino-2-nitro-4-methyl- (or -chloro)-benzene, and the aniline by other diazotizable bases, such as o-, m- or p-toluidine or o-, m- or p-anisidine, dyestuffs of similar properties are obtained.

I claim:

1. The process which comprises treating a mono-azodyestuff of the general formula

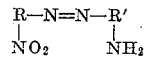

wherein R stands for the radical of an aromatic diazotization component, R' stands for the radical of a coupling component of the naphthalene series, and wherein the nitro group and the amino group each stand in ortho-position to the azo bridge in an aqueous alkaline reacting medium with a ferro compound in a quantity required for reducing the nitro group to the amino group at a temperature between about 20° C., and the boiling temperature of the reaction mixture.

2. The process which comprises dissolving or suspending a monoazodyestuff of the general formula

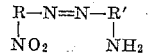

wherein R stands for the radical of an aromatic diazotization component, R' stands for the radical of a coupling component of the naphthalene series, and wherein the nitro group and the amino group each stand in ortho-position to the azo-bridge, in an aqueous medium to which has been added an alkali of the group consisting of caustic alkalies, alkali-metal bicarbonates, alkali metal carbonates, ammonia and watersoluble organic bases, and a watersoluble ferrous salt in the quantity required for reducing the nitro group to the amino group, and heating the alkaline reacting reaction mixture at a temperature between about 20° C. and its boiling temperature.

3. The process which comprises dissolving or suspending a monoazodyestuff of the general formula

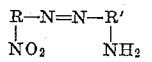

wherein R stands for the radical of an aromatic diazotization component, R' stands for the radical of a coupling component of the naphthalene series, and wherein the nitro group and the amino group each stand in ortho-position to the azo-bridge, in an aqueous medium to which has been added an alkali of the group consisting of caustic alkalies, alkali-metal bicarbonates, alkali metal carbonates, ammonia and watersoluble organic bases, and ferrous sulfate in the quantity required for reducing the nitro group to the amino group, and heating the alkaline reacting reaction mixture at a temperature between about 20° C. and its boiling temperature.

4. Monoazodyestuffs of the general formula:

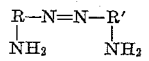

wherein R stands for the radical of an aromatic diazotization component, R' stands for the radical of a coupling component of the naphthalene series, and wherein the amino groups each stand in ortho-position to the azo-bridge, being, when containing solubilizing groups, soluble in aqueous alkalies, thereby yielding solutions of various colorations which on the addition of mineral acids generally are turned yellow to orange.

HUGO SCHWEITZER.